US011738692B2

(12) United States Patent
Neely, III (10) Patent No.: US 11,738,692 B2
(45) Date of Patent: Aug. 29, 2023

(54) SIDE MOUNT TRUCK BED TOOL BOX WITH ADJUSTABLE SIDE MOUNT LEGS

(71) Applicant: Curt Manufacturing, LLC, Eau Claire, WI (US)

(72) Inventor: Claude A. Neely, III, Perry, IL (US)

(73) Assignee: CURT Manufacturing, LLC, Eau Claire, WI (US)

( * ) Notice: Subject to any disclaimer, the term of this patent is extended or adjusted under 35 U.S.C. 154(b) by 114 days.

(21) Appl. No.: 17/499,589

(22) Filed: Oct. 12, 2021

(65) Prior Publication Data

US 2022/0111798 A1 Apr. 14, 2022

Related U.S. Application Data (60) Provisional application No. 63/090,483, filed on Oct. 12, 2020.

(51) Int. Cl.
*B60R 9/06* (2006.01)
*B60R 11/06* (2006.01)

(52) U.S. Cl.
CPC ............. *B60R 9/065* (2013.01); *B60R 11/06* (2013.01)

(58) Field of Classification Search
CPC ................................ B60R 9/065; B60R 11/06
USPC ..... 224/403, 404; 296/37.6; 248/644, 200.1, 248/354.1
See application file for complete search history.

(56) References Cited

U.S. PATENT DOCUMENTS

| 2,832,559 | A | * | 4/1958 | Hillberg | ................. E04G 21/26 254/98 |
| 3,320,698 | A | * | 5/1967 | Hummel | ................. E05F 11/34 114/361 |
| 3,829,153 | A | * | 8/1974 | Fussell, Jr. | ................. B60J 1/20 114/361 |
| 4,304,078 | A | * | 12/1981 | Meriwether, Jr. | ... E04F 21/0015 403/53 |
| 4,394,947 | A | * | 7/1983 | Tartaglia | ................. B60R 9/06 224/519 |

(Continued)

OTHER PUBLICATIONS

Deezee, Warranty and Side Mount / Topsider Toolbox Installation Instructions, posted online at https://www deezee.com/wp-content/uploads/instructions_raw/DZ%20SIDE%20MOUNT%20TB.pdf, Oct. 26, 2012.

(Continued)

*Primary Examiner* — Justin M Larson
(74) *Attorney, Agent, or Firm* — Shewchuk IP Services, LLC; Jeffrey D. Shewchuk (57) ABSTRACT

A set of adjustable side mount legs attach bed-side side-mount truck bed toolbox or similar container to most any truckbed configuration. A center section of the legs, which is adjustable in length, extends between two pivotally attached mounting brackets. The center section can be formed by two telescoping tubes, at least one of which has a series of bolt holes along its length, with a bolt attached through one of those bolt holes and through the other tube, such that the user can select and set the length between the two mounting brackets. One of the mounting brackets is attached by bolts to a bottom of the bed-side side-mount truck bed toolbox. The other mounting bracket of each leg is attached by rivet nut threaded inserts to a side of the truck bed sidewall.

17 Claims, 5 Drawing Sheets

(56) References Cited

U.S. PATENT DOCUMENTS

| | | | | |
|---|---|---|---|---|
| 4,737,056 | A * | 4/1988 | Hunt | B60P 7/15 410/151 |
| 4,789,195 | A * | 12/1988 | Fletcher | B60R 11/06 224/543 |
| 5,033,448 | A * | 7/1991 | Sandweg | A47J 37/0786 126/30 |
| 5,158,023 | A * | 10/1992 | Allen | E04G 5/00 182/120 |
| 5,685,467 | A | 11/1997 | Niemi et al. | |
| 5,924,615 | A | 7/1999 | McGarrah | |
| 6,513,690 | B1 * | 2/2003 | Churchill | B60R 9/06 224/523 |
| 6,582,169 | B1 * | 6/2003 | Cano-Rodriguez | B60P 7/15 410/127 |
| 6,637,363 | B2 * | 10/2003 | Schmitt | B63B 19/02 248/200.1 |
| 6,889,417 | B2 | 5/2005 | Jones et al. | |
| 7,168,590 | B2 | 1/2007 | Jones et al. | |
| 7,444,773 | B2 * | 11/2008 | Kolodziejczak, Sr. | G09F 21/048 40/607.14 |
| 8,033,435 | B1 * | 10/2011 | Brooke | B60R 9/065 312/231 |
| 8,393,665 | B2 * | 3/2013 | Villano | B60R 9/065 224/543 |
| 8,459,600 | B2 * | 6/2013 | Tarr | A63H 19/34 248/200.1 |
| 8,567,650 | B2 | 10/2013 | Read et al. | |
| 8,636,182 | B1 * | 1/2014 | Gordon | B60P 3/14 224/403 |
| 9,314,919 | B2 | 4/2016 | Harrison | |
| 10,286,543 | B2 | 5/2019 | Haun et al. | |
| 10,362,862 | B2 * | 7/2019 | Symalla | A47B 5/02 |
| 11,001,205 | B2 | 5/2021 | Reed, III | |
| 11,142,050 | B2 * | 10/2021 | Pompili | B60J 7/198 |
| 11,318,826 | B2 * | 5/2022 | Pompili | B60J 7/1607 |
| 2012/0325877 | A1 * | 12/2012 | Franks | B60R 11/06 224/404 |
| 2022/0258580 | A1 * | 8/2022 | Pompili | B60J 7/041 |
| 2022/0410984 | A1 * | 12/2022 | Smolik | B62D 33/0207 |

OTHER PUBLICATIONS

Uws, Installation Manual, Low Profile Truck Side Tool Box, posted online https://assets.curtmfg.com/masterlibrary/01UWS/EC30201/installsheet/EC30201-INS.pdf, admitted prior art.

* cited by examiner

SIDE MOUNT TRUCK BED TOOL BOX WITH ADJUSTABLE SIDE MOUNT LEGS

CROSS-REFERENCE TO RELATED APPLICATION(S)

The present application claims priority from U.S. Provisional Application No. 63/090,483 entitled SIDE MOUNT TRUCK BED TOOL BOX WITH ADJUSTABLE SIDE MOUNT LEGS filed Oct. 12, 2020, incorporated herein by reference.

BACKGROUND OF THE INVENTION

Tool boxes and similar storage containers have long been a common accessory for mounting in the back of pick-up trucks. Many such tool boxes are mounted on the bed floor, essentially eliminating any significant space between the top of the bed floor and the bottom of the tool box. Other tool boxes are elevated, with part or all of the bottom of the tool box being significantly higher than the top of the bed floor.

Many such elevated tool boxes are mounted from two or more walls defining the pickup truck bed, such as transversely. If a transversely mounted elevated tool box extends at least as high as the bed walls, it may be mounted to span from the right bed wall to the left bed wall, with a space underneath the tool box. Alternatively, a transversely mounted elevated tool box may be supported by feet adjacent to the right and left bed walls, such as shown in U.S. Pat. No. 5,685,467, incorporated by reference for its general toolbox teachings.

Another mounting location is with the elevated tool box extending longitudinally relative to the vehicle, with the tool box partially or fully toward the vehicle centerline relatively to the vertical plane defined by the inner side of the longitudinally-extending bed wall. This mounting location for the elevated tool box may allow for the user to access the top of the tool box or the tool box interior while standing on the ground, reaching over the right or left bed wall, and without requiring the user to climb into the truck bed. If the user does climb into the truck bed, the elevated tool box mounting location still raises its contents above the user's feet, making it easier for the user to access tools stored inside the toolbox.

Depending upon the exact right-to-left location of such a tool box relative to the bed wall, this mounting arrangement may cantilever significant weight of the tool box inwardly from the bed wall. Prior art truck side, side mount truck bed tool boxes, for mounting on the bed side with a low profile, in lengths of 36, 48, 60 and 72 inches, are known and commercially provided by Lippert Components, Inc. of Elkhart, Ind. under the UWS brand. The toolbox itself, particularly when loaded with heavy tools or similar content, can be quite heavy, requiring more support than can be easily provided merely from the top of the bed rail. Thus, such existing tool boxes can include vertical legs for support of the weight.

The prior art legs stand on the floor of the truck bed, and can interfere with hauling of certain cargo. For instance, some truck beds are sized with just enough clearance between the wheel wells to carry flat 4 ft.×8 ft (possibly with the tail gate open) sheets of building material (drywall, sheathing, etc). While elevating the tool box opens up significant space on top of the bed floor but underneath the tool box, the prior art vertical legs can nonetheless interfere with loading such sheets flat within the truck bed. Better solutions are needed.

BRIEF SUMMARY OF THE INVENTION

The present invention is a set of adjustable side mount legs for a bed-side side-mount truck bed toolbox or similar container. The present invention is also a toolbox kit and mounted toolbox utilizing such legs, as well as a method of mounting the bed-side side-mount truck bed toolbox or similar container using such legs relative to a side wall of a pickup truck. A center section of the legs, which is adjustable in length, extends between two pivotally attached mounting brackets. One of the mounting brackets of each leg becomes the upper mounting bracket by attachment to a bottom of the bed-side side-mount truck bed toolbox. The other mounting bracket of each leg is attached to a side of the truck bed sidewall. Rivet nut threaded inserts are preferably seated within a hole in the side of the truck bed sidewall and used to attach the second mounting bracket. With both the angle and length of the legs being adjustable, and with both mounting brackets being pivotable relative to their legs, the invention is adaptable to most any truckbed configuration.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
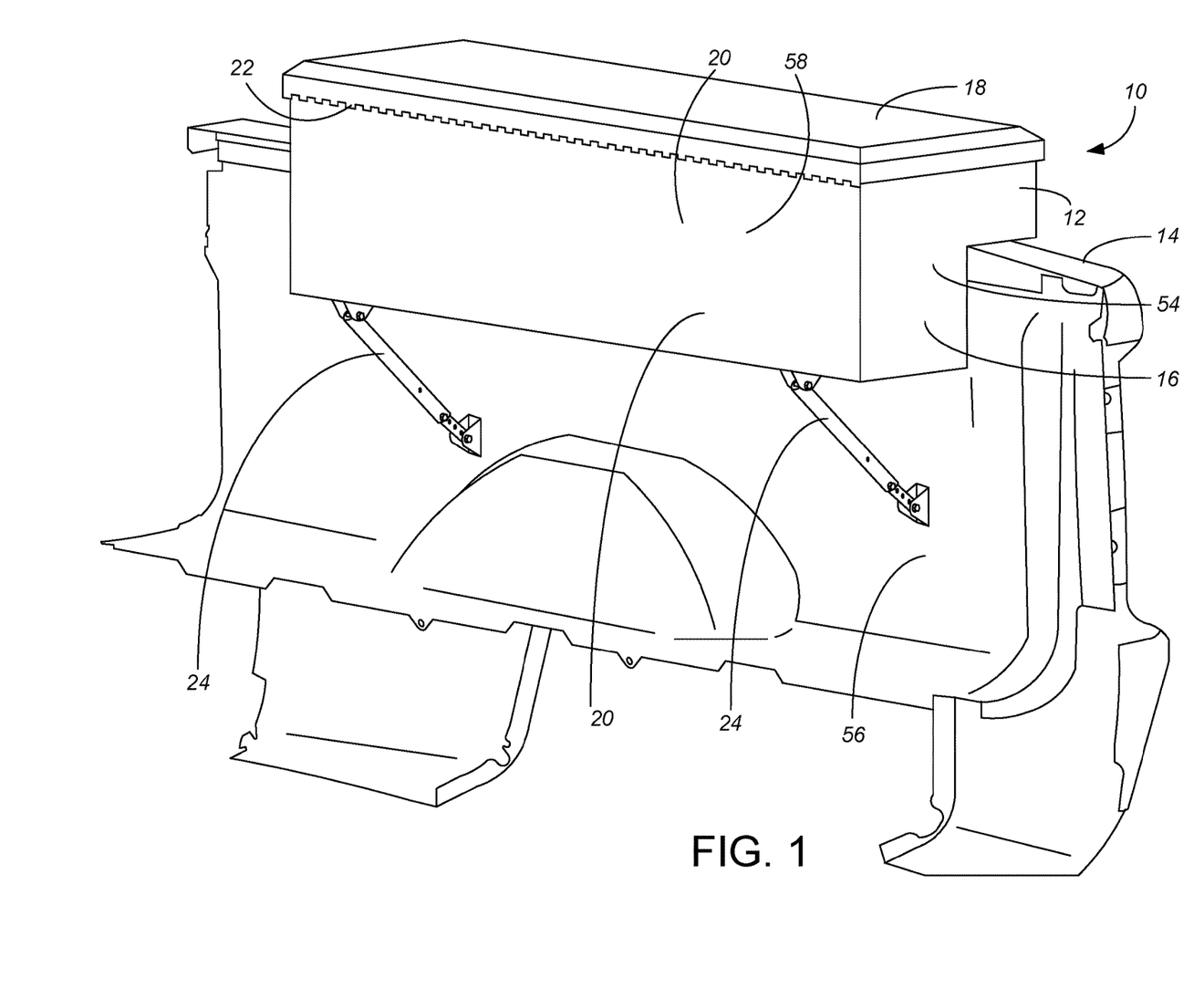
FIG. 1 is a perspective view, from the upper-rear-left, of a preferred tool box in accordance with the present invention mounted on a right side bed wall, showing the hydroformed sheet metal shapes of the interior sheet metal and the exterior of the bed wall.
Figure 2:
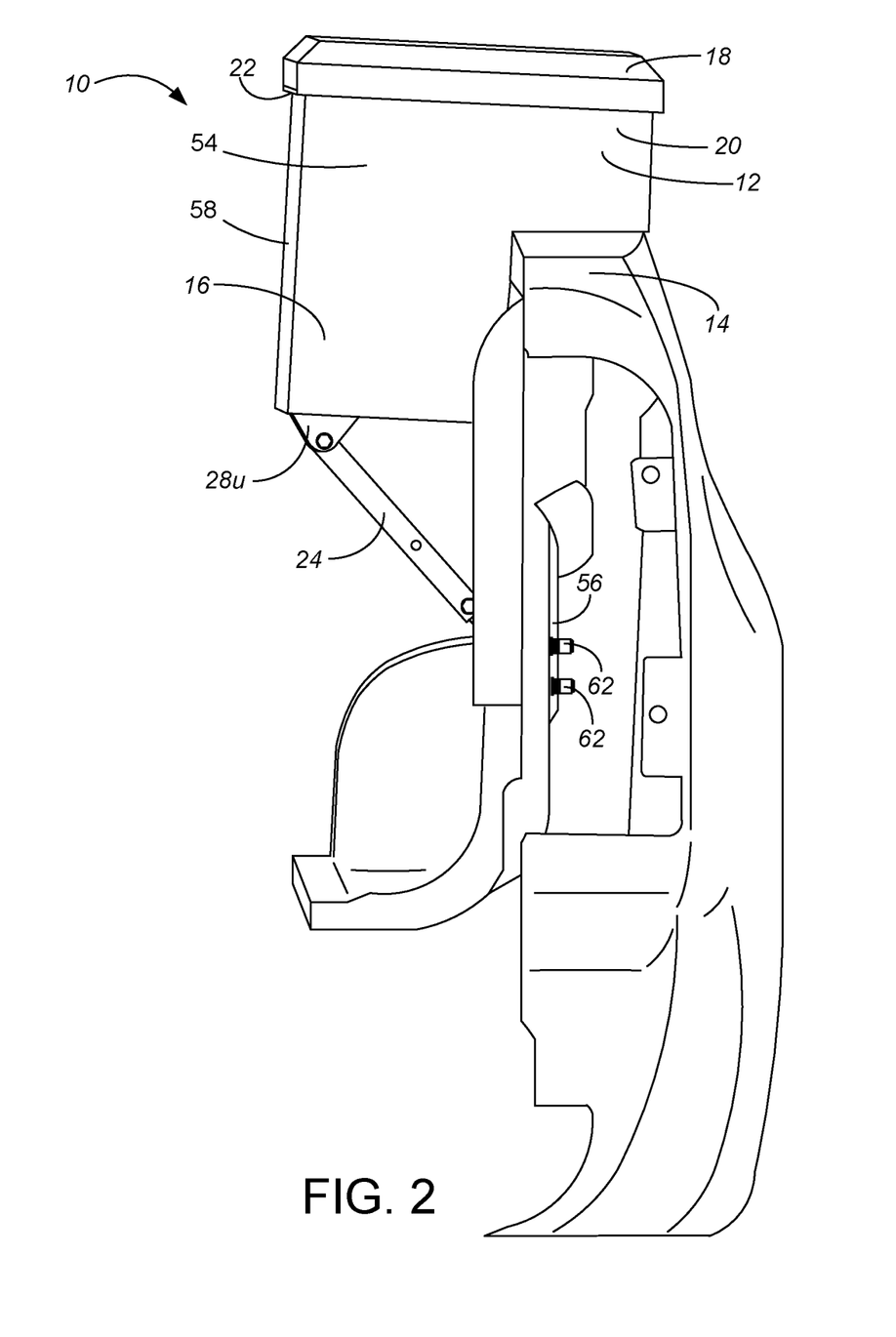
FIG. 2 is a rear elevational view of the tool box and right side bed wall of FIG. 1.

A preferred embodiment of the mounted toolbox 10 is shown in FIGS. 1 and 2. The toolbox 10 shown is rectangular with a length of about 48 inches, although other lengths, such as lengths of 36, 60 and 72 inches, are also common and can equivalently incorporate the present invention, as can other container shapes. The preferred toolbox 10 is a low profile variety, and includes a shallower section 12 of about 5 inches wide and 3 inch overall tub depth which extends over the top of the bed rail 14 and another deeper section 16 of about 9 inches wide and 12 inch overall tub depth which extends to the inner side of the bed rail 14. The tool box 10 includes a rigid lid 18 hinged to the tub 20. Because the tool box 10 adds only about 3 inches to the height of the bed rail 14, the user is provided with a better view out the rear window (not shown) of the pickup truck (not fully shown).

The most preferred tool box 10 has a one-piece tub 20 formed out of 0.058" thick aluminum sheet material to hold heavy tools and cargo and prevent leaks. The most preferred lid 18 is a foam-filled lid formed in accordance with U.S. Pat. Nos. 6,889,417 and 7,168,590, both incorporated herein by reference. The extra-rigid foam-filled lid 18 creates a solid structure to prevent bending or warping, pivotable on a hinge 22 to ensure smooth opening and closing. The preferred hinge connection allows opening of the lid 18 from its horizontal rest position when closed (shown in FIGS. 1 and 2) through at least 90° to an open rest position. A microseal gasket (not shown) between the lid 18 and the tub 20 can be provided to help seal out moisture, dust and dirt. A stainless steel lock handle (not shown) can be provided for security and corrosion-resistant operation.

Figure 3:
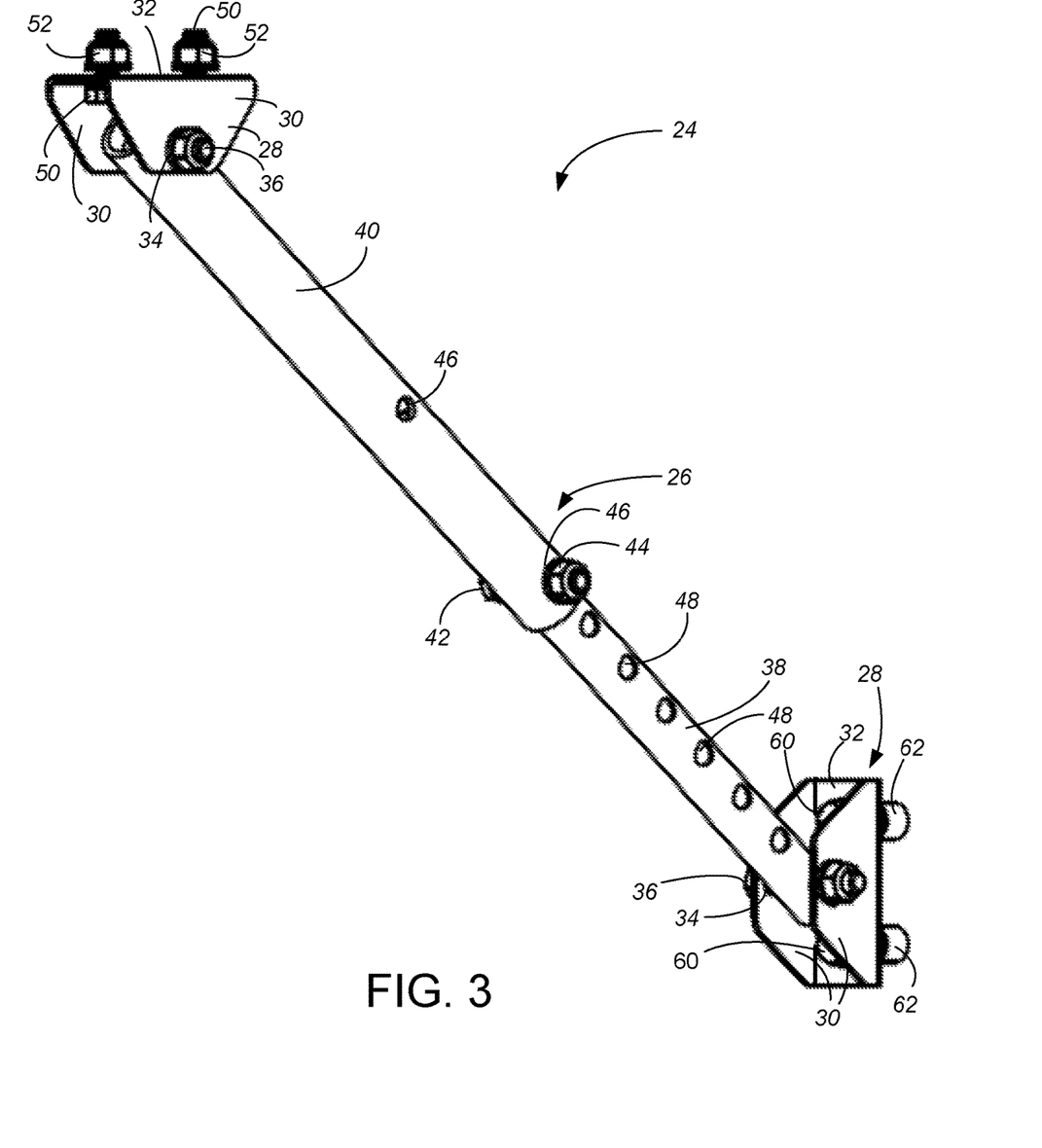
FIG. 3 is a perspective view of one of the preferred adjustable side mount legs.
Figures 4, 5:
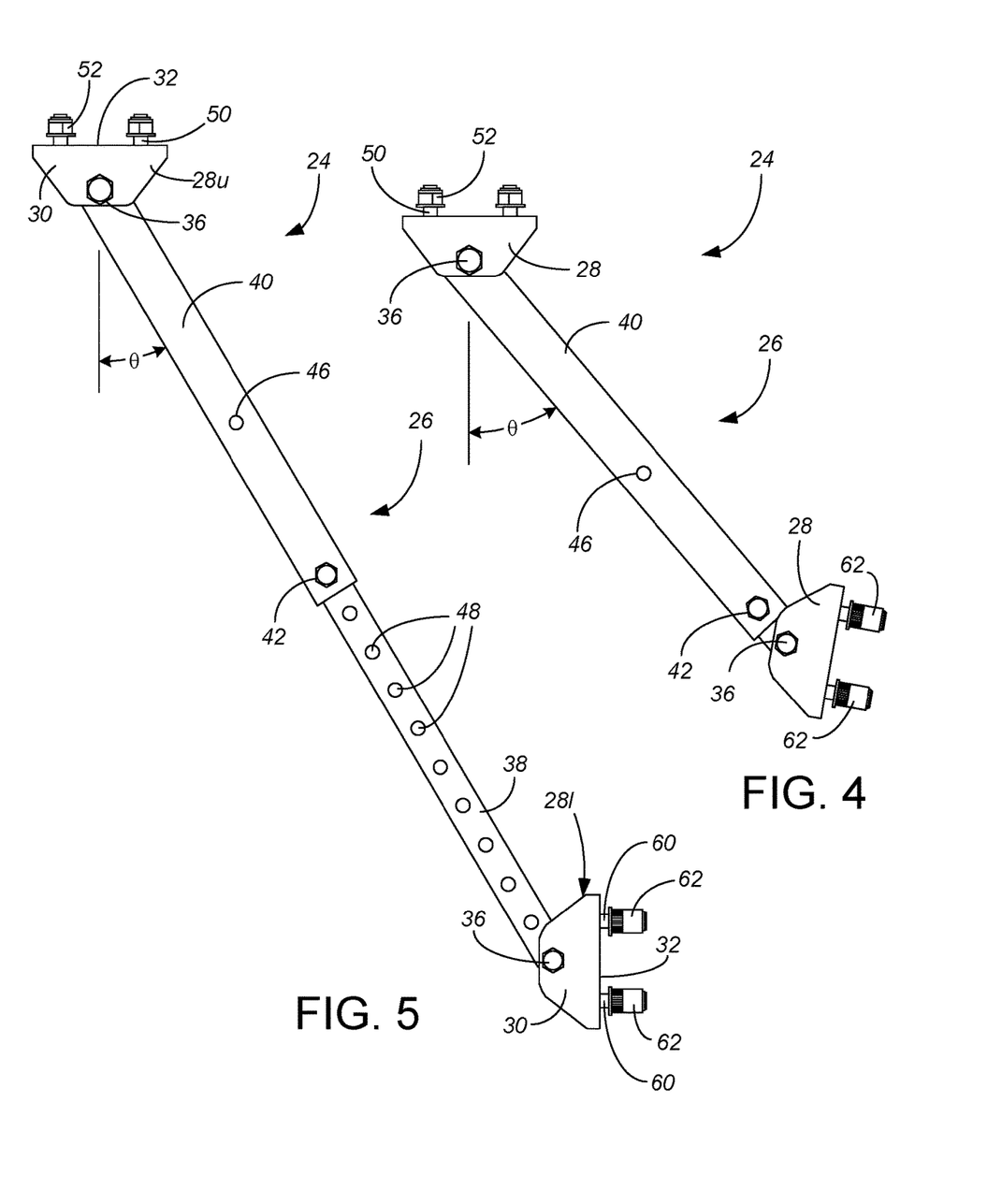
FIG. 4 is a rear elevational view of the preferred adjustable side mount leg of FIG. 3 in a fully shortened configuration.
FIG. 5 is a rear elevational view of the preferred adjustable side mount leg of FIG. 3 in a fully lengthened configuration.

The legs 24, best shown in FIGS. 3-5, include a center section 26 which is preferably adjustable in length, running between two mounting brackets 28. Each mounting bracket 28 is attached to one of the opposing ends of the center section 26 of the leg 24 so the mounting bracket 28 is pivotable relative to the center section 26. The preferred mounting brackets 28 are formed by stamping and bending a flat of 16 gauge sheet steel to include two ears 30 extending perpendicularly from a flat central base section 32. The two ears 30 each have a coaxial bolt hole 34 defined therethrough, allowing a bolt 36 to be used to create a pivoting connection between the bracket 28 and the center section 26 of the leg 24. In the most preferred embodiment, the bolted connection allows the mounting bracket 28 to be pivotable relative to its center section 26 of the leg 24 about a range of about +−90° until the base 32 of the bracket 28 contacts the center section 26 of the leg 24. As an alternative to the bolted connection between the mounting brackets 28 and the center section 26, the bolt 36 could be replaced by a pivot pin, rivet or similar structure, press fit, welded, adhesively attached or having peened ends to attach it to either the mounting bracket 28 or the center section 26 of the leg 24.

The center section 26 of each leg 24 is preferably adjustable in length, such as being formed from two telescoping steel tubes 38, 40. A bolt 42 and nut 44 are preferably used to set the length adjustment. For both bolts 36 and bolt 42, which side is used for the head and which side is used for the nut is insignificant. In the preferred arrangement, at least one and more preferable two sets of two coaxial bolt holes 46 are provided in the outer tube 40, such as at a spacing of 3 inches (76 mm) apart, while a series of equally spaced sets of two coaxial bolt holes 48 are provided in the inner tube 38, such as at a spacing of 0.75 inches (19 mm) apart. By placing a single length-setting bolt 42 through one of the sets of bolt holes 46, 48 in each tube 38, 40, the length of the leg 24 is selected by the user. In the preferred embodiment, the series includes ten sets of length adjustment bolt holes 48, thereby allowing the preferred legs 24 to have a leg length anywhere from 8¾ (220 mm, shown in FIG. 4) to 15 inches (380 mm, shown in FIG. 5) long, selectable at ¾ inch increments. The preferred leg sections 38, 40 are formed from powder-coated carbon steel tubes, so as to be strong, robust and corrosion resistant. For instance, the inner tube 38 can have a wall thickness of 0.04 inches (1 mm) and an outer diameter of 0.6 inches (15 mm), while the outer tube 40 can have a wall thickness of 0.08 inches (2 mm) and an outer diameter of 0.8 inches (20 mm). While a separate smaller size of mounting bracket could be used for the inner tube 38 than for the outer tube 40, preferably the two mounting brackets 28 on each leg 24 are identical to minimize the number of different parts, with the gap between the ears 30 and the inner tube 38 filed by a pair of washers (not shown). Zinc-coated steel fasteners (bolts, lock nuts, flat washers and/or spring washers) can be used.

For each leg 24, one of the mounting brackets 28$u$ (which becomes the upper end of the leg 24) is secured to the bottom side of the toolbox 10, such as by two bolts 50 and mating threaded lock nuts 52. The preferred placement for each upper end mounting bracket 28$u$ is near the end 54 of the tool box 10 and far away from the bed wall 56. For instance, the most preferred placement for the mounting bracket 28$u$ is within 6 inches of the end 54 of the tool box 10 and within 3 inches of the inner side wall 58 of the tool box 10.

As shown by a comparison of FIGS. 4 and 5, the pivot point connection of the mounting bracket 28$u$ to its leg 24 allows the angle $\theta$ of the leg 24 relative to vertical to be selected as desired for a particular mounting situation. If desired, the legs 24 can be used vertically, similar to the vertical orientation of legs of prior art side mount tool boxes, and the lower end mounting bracket 28$l$ secured to the top of the truck bed floor or (space permitting) to the horizontal top of the wheel well. More preferably and as shown in FIGS. 1-5, the legs 24 are angled relative to vertical, with the lower end mounting bracket 28$l$ mounted on a portion of the inner side wall 56 of the truck bed which extends vertically, or substantially vertically. Note that, because the lower mounting bracket 28$l$ is also pivotable, the connection location on the inner side wall 56 need not be exactly vertical, but instead can be tilted to vertical as shown in FIG. 4 to account for whichever shape is convenient for the inner side wall 56 of the bed rail 14. To provide a significant upward force on the bottom of the tool box 10, the legs 24 should be at an angle $\theta$ of no more than 75° relative to vertical, and more preferably at an angle $\theta$ within a range of 15 to 45° relative to vertical. The most preferred leg angle $\theta$ is at about 40° relative to vertical. If desired, tabs or stops (not shown) can be formed into the bracket ears 30 which interfere with the inner and/or outer tubes 38, 40 once the angle of the plane of the mounting bracket base 32 relative to its tube 38, 40 exceeds a set minimum (such as a minimum in the range of 15 to 40°). With both the angle $\theta$ and length of the legs 24 being adjustable, and with both mounting brackets 28$u$, 28$l$ being pivotable relative to their legs 24, the invention is adaptable to most any truckbed configuration.

Each lower mounting bracket 28$l$ is then secured in its desired position using two bolts 60. For instance, holes can be drilled and rivnut threaded inserts 62 can be used to allow blind mounting to the bed wall 56. When provided as part of a kit for aftermarket installation, and the kit can include a hand rivnut setting tool (not shown), perhaps including a jamnut on a reverse threaded portion of the rivnut setting tool.

Specific aftermarket installation instructions for the side mount tool box 10 are as follows. First, the truck is parked on level ground, and the tool box 10 is placed on the bed rail 14 of the truck with the handles and logo plate facing outward. The user should ensure that the tool box 10 is level, placing a support brace (not shown) under a corner of the tool box 10 that is not resting on the bed rail 14 so the lid 18 can be horizontal and checked with a level (when parked on flat ground). Depending upon the length of the tool box 10, either two or three holes are drilled downwardly through the shallow portion 12 of the tool box 10 and into the top of the bed rail 14. A bolt with washer (not shown) is inserted downwardly through each drilled hole, secured with a washer and lock nut (not shown) under the bed rail 14. Alternatively, rivnut threaded inserts (not shown) can also be used with the top of the bed rail 14 if there is insufficient access for a lock nut.

Next the user determines the desired locations for the two upper mounting brackets 28u on the bottom of the truck side tool box 10. The user marks and drills the inward (closer to the vehicle longitudinal centerline) mounting hole only, installing each upper mounting bracket 28u with a bolt 50 from below, tightening down a mating threaded nut 52 from inside the tool box 10.

The user thereafter angles the leg 24 by pivoting about the upper pivot bolt 36, while simultaneously lengthening or shortening the leg 24 so as to place its lower mounting bracket 28l flush with the truck bed side wall 56 or fenderwell at an acceptably flat and unobstructed mounting location. Due to the fact that only one bolt 50 is being used (and only one mounting hole has been drilled) to attach the upper mounting bracket 28u to the tool box 10, the leg 24 can also be rotated somewhat, giving some freedom in forward-rearward selection of the mounting location for the lower mounting bracket 28l. The user selects and sets the length of each leg 24 by inserting the bolt 42 through aligned holes 46, 48 on the inner and outer tubes 38, 40, tightening the bolt 42 in place with the lock nut 44.

Once the length of each leg 24 has been established, the user marks both mounting bracket hole locations for each lower mounting bracket 28l, drilling holes into the inside wall 56 of the pickup truck bed to fit the rivet nut threaded inserts 62. The holes should not be made larger than required or the rivet nut threaded inserts 62 may fail to install.

Figure 6:
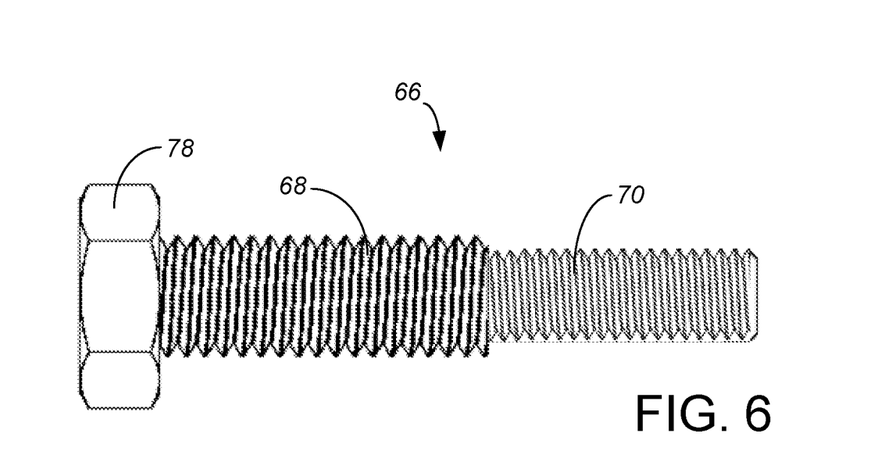
FIG. 6 is a side view of a left-hand, right-hand threaded bolt used to install rivet nut threaded inserts.
Figure 7:
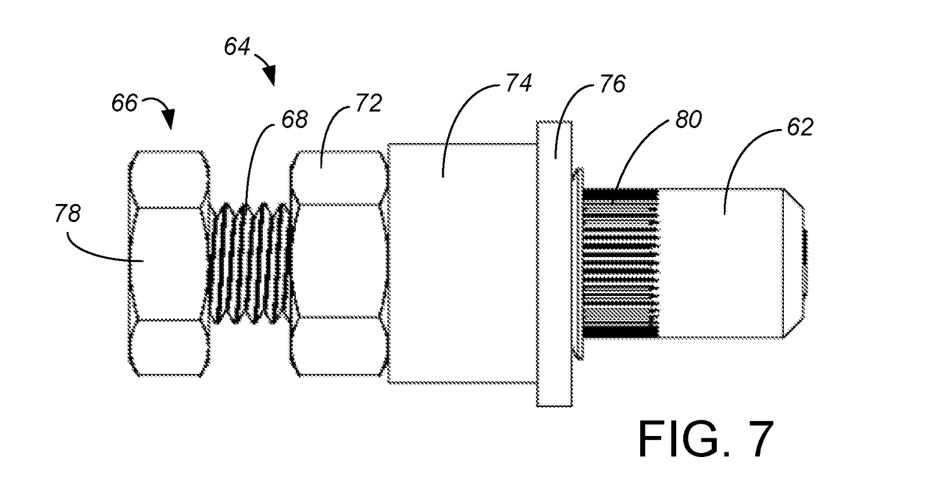
FIG. 7 is a side view of an assembly used in installing rivet nut threaded inserts.

The rivet nut threaded inserts 62 are installed using a bolt or a rivet nut setting tool, with a preferred rivet nut setting tool assembly 64 shown in FIGS. 6 and 7. For instance, the rivet nut threaded inserts 62 may be installed using a bolt 66 which has a left hand threaded proximal section 68 and a right hand threaded distal section 70. The user screws a left hand jamnut 72 completely onto the thread-set tool 66, and slides an unthreaded thread-set spacer 74 (and possible additional washer 76) on until it rests against the left hand jamnut 72. The rivet nut threaded insert 62 is hand screwed fully onto the right hand distal threads 70 until it abuts the thread-set spacer/washer 74/76. The tool/rivnut assembly 64 is then positioned with the threaded insert 62 within the drilled hole in the inside wall 56 of the pickup truck bed. The user then holds the jamnut 72 against rotation using a wrench (not shown), while using another wrench or a socket (not shown) to turn the head 78 of the tool bolt 66 clockwise, about two additional full rotational turns after tension is felt, which deforms a central portion 80 of the rivet nut threaded insert 62 outwardly behind the hydro-formed sheet metal interior wall 56 of the pickup truck bed rail 14. Overtightening may damage the thread-set tool 64 and/or vehicle panel 56, and the rivet nut threaded insert 62 should only be deformed enough to seat it in the hole without rotating. The thread set tool bolt 66 is then rotationally backed out of the seated rivet nut threaded insert 62, for reuse of the thread set tool 64 on a subsequent rivet nut threaded insert 62. Once the two rivet nut threaded inserts 62 have been seated for a lower mounting bracket 28l, the lower mounting bracket 28l is secured to the truck bed side wall 56 or fenderwell by threading/tightening bolts 60 into the seated rivet nut threaded inserts 62.

After the lower mounting bracket 28l has been fully attached to the truck, the user marks and drills the outward (closer to the sidewall 14) mounting hole for the upper mounting bracket 28u on the bottom of the tool box 10. The user inserts the second bolt 50 from below, tightening down a mating threaded nut 52 from inside the tool box 10, thereby fully securing the tool box 10 with its legs 24.

Before drilling any of the six or seven holes into truck bed, the user should check under the vehicle to ensure the drill location does not puncture, cut or obstruct any brake or fuel fluid lines, electrical wires, fuel tanks, etc. Precaution must be taken that all fasteners near the fuel tank do not create the possibility of fuel tank puncture or other damage during a collision.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A side mount leg assembly and side mount toolbox for installing relative to a side wall of a pickup truck, the side mount leg assembly comprising:
    a center section which is adjustable in length between two ends, such that a user can fix the length of the center section at any of a plurality of different lengths between the two ends;
    a first mounting bracket pivotally attached to the center section at a first of the two ends, the first mounting bracket having at least one bolt hole therethrough with a bolt for attachment to a bottom of the bed-side side-mount truck bed toolbox;
    a second mounting bracket pivotally attached to the center section at a second of the two ends, the second mounting bracket having at least one bolt hole therethrough with a bolt for attachment to a side of a truck bed sidewall; and
    a rivet nut threaded insert, deformable in a hole in a side of the truck bed sidewall to allow seating of the insert within the hole, which threadingly mates with the bolt extending through the bolt hole in the second mounting bracket; the side mount toolbox comprising: a container having a tub and a lid, the tub having a first, shallower section for resting upon a top of the side wall of the pickup truck bed and a second, deeper section extending inwardly toward a centerline of the pickup truck from the first, shallower section, wherein the first mounting bracket is securable to a bottom of the second, deeper section.

2. The side mount leg assembly and side mount toolbox of claim 1, wherein the center section comprises:
    an outer tube with a plurality of sets of coaxially aligned bolt holes therethrough, wherein a bolt through one of the sets of coaxially aligned bolt holes pivotally attaches the outer tube to the first mounting bracket at a first end of the outer tube;
    an inner tube having a first end telescopingly received in a second end of the outer tube, the inner tube having a plurality of sets of coaxially aligned bolt holes therethrough, wherein a bolt through one of the sets of coaxially aligned bolt holes pivotally attaches the inner tube to the second mounting bracket at a second end of the inner tube; and a length setting bolt for setting and securing the length of the center section by first aligning a second of the sets of coaxially aligned bolt holes through the outer tube with a second of the sets of coaxially aligned bolt holes through the inner tube and then inserting and securing the length setting bolt in the aligned second sets of bolt holes.

3. The side mount leg assembly and side mount toolbox of claim 2, wherein each mounting bracket is formed by bending a sheet metal flat to include two ears extending perpendicularly from a flat central base section.

4. The side mount leg assembly and side mount toolbox of claim 3, wherein the first mounting bracket is identically sized and shaped as the second mounting bracket.

5. The side mount leg assembly and side mount toolbox kit of claim 1, wherein the lid is hingedly attached to the tub along a side of the second, deeper section of the tub.

6. A toolbox container mounted from a single side wall of a pickup truck bed, comprising:
   a tub having a first, shallower section resting upon a top of the side wall of the pickup truck bed and a second, deeper section extending inwardly toward a centerline of the pickup truck from the first, shallower section; and
   at least one side mount leg assembly comprising:
      a first mounting bracket fixed to a bottom of the second, deeper section of the tub;
      a center section extending at an angle within a range of 15 to 45° relative to vertical between an upper end and a lower end, the center section having a pivotable connection at its upper end to the first mounting bracket; and
      a second mounting bracket having a pivotable connection to the lower end of the center section, the second mounting bracket being fixed to a vertically extending section of the side wall of the pickup truck bed.

7. The toolbox container of claim 6, wherein the center section comprises:
   an outer tube pivotally attached to the first mounting bracket at an upper end of the outer tube;
   an inner tube telescopingly received in the outer tube, the inner tube being pivotally attached to the second mounting bracket at a lower end of the inner tube; and
   a length setting bolt extending through both the outer tube and the inner tube.

8. The toolbox container of claim 7, wherein the first mounting bracket and the second mounting bracket are each formed by bending a sheet metal flat to include two ears extending perpendicularly from a flat central base section.

9. The toolbox container of claim 8, wherein the outer tube is attached to the first mounting bracket by a bolt extending through aligned bolt holes in each of the two ears of the first mounting bracket and the upper end of the outer tube, and wherein the inner tube is attached to the second mounting bracket by a bolt extending through aligned bolt holes in each of the two ears of the second mounting bracket and the lower end of the inner tube.

10. The toolbox container of claim 6, wherein the second mounting bracket is fixed to the vertical section of the side wall of the pickup truck bed using a rivet nut threaded insert deformed so as to be seated in a hole through a vertical section of the side wall of the pickup truck bed.

11. The toolbox container of claim 6, further comprising a lid hingedly attached to the tub along a side of the second, deeper section of the tub.

12. The toolbox container of claim 6, comprising two side mount leg assemblies.

13. A method of mounting a toolbox container from a single side wall of a pickup truck bed, comprising:
   placing a tub onto a top of the single side wall of the pickup truck bed such that a portion of the tub cantilevers inwardly toward a centerline of the pickup truck from the side wall of the pickup truck bed;
   setting a length of a center section of a side mount leg assembly, the side mount leg assembly having a first mounting bracket pivotally attaching an upper end of the center section to a bottom of the tub and a second mounting bracket pivotally attached to a lower end of the center section; and
   securing the second mounting bracket to a side of the side wall of the pickup truck bed such that the center section extends at an angle relative to vertical.

14. The method of claim 13, further comprising:
   drilling at least a first hole through the bottom of the tub; and
   bolting the first mounting bracket to the bottom of the tub using the first hole.

15. The method of claim 14, comprising:
   after securing the second mounting bracket to the side of the side wall of the pickup truck bed, drilling a second hole through the bottom of the tub; and
   bolting the first mounting bracket to the bottom of the tub using the second hole.

16. The method of claim 13, wherein the act of securing the second mounting bracket to the side of the side wall of the pickup truck bed comprises:
   drilling at least one hole through the side of the side wall of the pickup truck bed;
   deforming a rivet nut threaded insert to seat the insert within the hole through the side of the side wall of the pickup truck bed; and
   positioning a bolt through a hole in the second mounting bracket and threadingly tightening the bolt into the rivet nut threaded insert.

17. The method of claim 13, wherein the center section of the side mount leg assembly comprises:
   an outer tube; and
   an inner tube telescopingly received in the outer tube;
and wherein the act of setting the length of the center section comprises:
   positioning a length setting bolt through aligned holes in the outer tube and the inner tube.

* * * * *